United States Patent [19]

Aldissi

[11] Patent Number: 5,262,591
[45] Date of Patent: Nov. 16, 1993

[54] INHERENTLY-SHIELDED CABLE CONSTRUCTION WITH A BRAIDED REINFORCING AND GROUNDING LAYER

[75] Inventor: Mahmoud Aldissi, Colchester, Vt.

[73] Assignee: Champlain Cable Corporation, Winooski, Vt.

[21] Appl. No.: 901,291

[22] Filed: Jun. 19, 1992

Related U.S. Application Data

[63] Continuation-in-part of Ser. No. 748,146, Aug. 21, 1991.

[51] Int. Cl.⁵ .............................................. H01B 11/18
[52] U.S. Cl. ........................................ 174/36; 174/34; 174/106 SC
[58] Field of Search ...................... 174/36, 34, 102 SC, 174/106 SC; 252/513

[56] References Cited

U.S. PATENT DOCUMENTS

| | | | |
|---|---|---|---|
| 3,191,132 | 6/1965 | Mayer | 174/36 |
| 4,347,487 | 8/1982 | Martin | 174/36 X |
| 4,371,742 | 2/1983 | Manly | 174/36 |
| 4,486,721 | 12/1984 | Cornelius et al. | 174/36 |
| 4,506,235 | 3/1985 | Mayer | 174/36 X |
| 4,510,468 | 4/1985 | Mayer | 174/36 X |
| 4,816,614 | 3/1989 | Baigrie et al. | 174/36 |
| 4,920,233 | 4/1990 | Kincaid | 174/36 |
| 4,970,488 | 11/1990 | Horiike et al. | 174/102 SC X |
| 5,047,260 | 9/1991 | Durand | 427/54.1 |
| 5,170,010 | 12/1992 | Aldissi | 174/36 |
| 5,171,937 | 12/1992 | Aldissi | 174/36 |
| 5,206,459 | 4/1993 | Aldissi | 174/36 |

FOREIGN PATENT DOCUMENTS 190939 8/1986 European Pat. Off. ............ 174/36

Primary Examiner—Morris H. Nimmo
Attorney, Agent, or Firm—Salzman & Levy

[57] ABSTRACT

The present invention features a new "filter line" cable of very thin construction. The thinner cable has a reinforcing mesh layer that lends physical strength to the otherwise thinner, weakened cable. Additionally, the reinforcing mesh provides grounding and some shielding. The reinforcing mesh layer is made of a thin metal wire or metal-coated fibers. The filter line cable has a conductive core having a primary insulation layer. Over the primary insulation is a filtering layer made up of metal-coated ferromagnetic particles of ferrite or magnetite dispersed within a polymeric matrix such as Viton, a fluorinated elastomeric polymer. The ferromagnetic particles may be "spherical", to enhance the filtering effect. The filtering layer provides the "filter line" protection against internal RFI and microwave interferences traveling down the wire. Over the filtering layer is a layer of metal wire or metal-coated fibers, woven or served into a mesh. This layer shields the filtering layer and provides protection against external EMI signals. The reinforcing mesh layer is lightweight and provides a minimum of shielding coverage, i.e., approximately between 15 to 50% of the filter line layer; its primary purpose is to provide physical reinforcement and grounding.

18 Claims, 2 Drawing Sheets

//5,262,591//

INHERENTLY-SHIELDED CABLE CONSTRUCTION WITH A BRAIDED REINFORCING AND GROUNDING LAYER

RELATED APPLICATION

This application is a continuation-in-part of copending U.S. Pat. application, Ser. No. 07/748,146, filed on Aug. 21, 1991. Priority is claimed to common subject matter contained in the parent application, and the teachings expressed therein are hereby incorporated in this application by reference.

1. Field of the Invention

The invention relates to a "filter line" cable featuring a meshed shielding layer for reinforcement of the filter line layer, which needs physical strengthening due to its reduced size, and, more particularly, to a "filter line" cable construction which features a reinforcing layer that provides some additional shielding, as well as electrical grounding. This "filter line" cable is further characterized as one comprising metal-coated particles of ferrite or magnetite dispersed within a polymeric matrix of the filter line layer. The metal-coated particles are further distinguishable over the art in that they can include "spherical" ferromagnetic particles. The filter line layer is overlaid with a shield made of light-weight metal or metal-coated fiber; this improves the shielding thereof and also provides a grounding layer.

2. Background of the Invention

Wire providing microwave/radar frequency attenuation is referred to in the wire and cable trade as "filter line". Some of these cables are referenced by U.S. Mil. Spec. No. Mil-C-85485. The measurement of the attenuation (insertion loss) upon a given wire's performance relates to the effect that the filter line has upon the interference signals which are conducted down the wire. Such wire and cable can also be shielded from external EMI signals by providing an overlayer of braided or served metal mesh.

The ever-increasing high technology requirements of the aerospace industry demand that filter line and shielded cables be smaller in size, more flexible and lighter in weight. Utilizing the commercial materials that are presently available, some of the latest industry requirements cannot even be met.

This invention seeks to provide new, space-age materials in unique combinations to provide EMI, microwave and radar filtering and shielding capabilities in a wider frequency range than heretofore available. At the same time, the invention provides a cable product that utilizes thinner filtering and shielding layers, which reduces the size of the composite cable construction. In addition, the newer materials are lighter; their thinner cross-sections further reduce the weight of the finished cable product. Another advantage of the thinner shielding layers is the increased flexibility of the cable.

Recently, ferromagnetic particles of ferrite or magnetite have been coated with metal in order to provide conductive materials having advantageous electrical and magnetic properties. It is contemplated with this invention that these types of materials can be loaded into a polymeric matrix for use as an interference layer in the fabrication of "filter line" cable.

The current invention reflects the discovery that, when ferrites are mixed with certain polymers, they provide easily extrudable compounds that are most suitable for wire and cable fabrication. Such compounds can be directly extruded over bare or insulated wire to form a wire and cable article that attenuates (filters) high-frequency interferences down the cable line. The "spherical" shape of the particles, as taught by the above-mentioned patent application, adds a further attenuation advantage; it increases the operational frequency range.

The filter line cable of this invention has been reduced in size. The various layers of the construction have been made exceptionally thin. As a result, the cable is further reinforced by a mesh layer. The addition of a thinly overlaid shielding layer provides reinforcement to strengthen the cable construction, as well as a grounding layer. This shielding layer comprises a lightweight layer of braided metal wire or conductive fiber. This shielding potential is low, since the mesh provides a coverage over the filter line layer of only approximately 15-50%. The mesh can be either braided, woven or served.

Properly shielded filter line provides additional protection against radiated EMI. Noise currents and voltages are induced on the conductors of the cables when a radiated field causes interference. Filter line can attenuate such noise when it is shielded with a metallic braid or other forms of shield layering. The shielding effect can be measured by transfer impedance techniques.

The present invention seeks to fabricate wire and cable articles that provide protection against both of the aforementioned effects, namely, attenuation of signals conducted down the wire and radiated interferences penetrating the cable.

The current invention contemplates a wire or cable construction using a layer composed of silver-coated magnetic particles such as ferrites or magnetites dispersed in a polymeric matrix, such as Viton (a fluorinated elastomeric polymer manufactured by Du Pont). The magnetic particles are provided by various manufacturers, including Steward Manufacturing Company of Tennessee and Fair-Rite Products Corporation of New York. The impedance characteristics of the magnetic particles vary, depending upon the supplier, fabrication conditions and composition. Metal coating (such as silver) is provided by Potters Industries, Inc., of Parsippany, N.J.

High-frequency signals conducted down this wire are partially absorbed by the silver-coated particle shield layer. The electromagnetic waves penetrate through this wire or fiber mesh shield layered over the filter line layer, impinging upon the ferrite particles. The electromagnetic waves are then dissipated by lattice vibration or phonon emission. The wire or fiber mesh shield layer enhances this effect, while also providing a physical strengthening and a grounding of the cable. The advantages of such a construction include a savings in cost, a streamlined economy of size and weight, and an increased flexibility, while also maintaining the operative frequency range of the cable.

SUMMARY OF THE INVENTION

In accordance with the present invention, there is provided a new "filter line" cable having a grounding and reinforcing shield layer comprising a thin mesh of metal wire or metal-coated fiber. The filter line cable comprises a conductive core having a primary insulation layer. Over the primary insulation is a filtering layer made up of metal-coated ferromagnetic particles of ferrite or magnetite dispersed within a polymeric matrix such as Viton, a fluorinated elastomeric polymer. The filtering layer provides the "filter line" protection against internal RFI and microwave interferences traveling down the wire. The ferromagnetic particles may be "spherical", to enhance the filtering effect. The reinforcing mesh layer is lightweight and provides a minimum of shielding coverage, i.e., approximately between 15 to 50% of the filter line layer. The mesh layer can comprise wire or fiber of 38 gauge that is braided, woven or served into a mesh. This layer shields the filtering layer, providing protection against external EMI signals. The shield layer's primary purpose, however, is to provide physical reinforcement and grounding. An insulating-jacket layer is disposed over the shield layer; the former is composed of materials such as polytetrafluoroethylene (Teflon), polyimide (Kapton), fluorinated polyethylenes, carbon-filled fluorinated polyethylenes and combinations thereof, etc.

The ultra-thin cable construction featuring these new filtering, shielding and reinforcing layers maintains good operational frequency ranges against EMI, microwave and RFI interferences, while also providing improvements in cable size, weight, flexibility and cost. Such improvements are in keeping with stringent and rigorous aerospace industry requirements.

The mixture compound of conductive ferromagnetic particulates and polymer binder can be prepared by state-of-the-art compounding techniques and then molded or extruded to provide the filtering layer, as taught in the aforementioned patent application. The magnetic particles can be metal-coated by processes such as that described in European Patent Application, Publication No. 0 354 131 A2, by C. F. Schneider et al, entitled "Ferrite Particle Plating System and Electromagnetic Shielding", published Feb. 7, 1990.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features ultra-thin cable constructions utilizing new types of filtering and shielding materials in combination. These materials are particularly useful in the fabrication of shielded "filter line" wire and cable articles having good operational frequency ranges. The "filter line" materials are metal-coated ferromagnetic particles comprising magnetite and/or ferrite particles dispersed within a binding polymer or a combination of binding polymers. The filtering materials can be layered, extruded, coated, wrapped, etc., over an insulated conductive core. The metal-coated particles are fabricated by techniques such as electrodeposition, vacuum deposition and other well-known methods (e.g., as described in the aforementioned European Patent Application, Publication No. 0 354 131 A2). These particles can be "spherical" in accordance with the aforementioned patent application, Ser. No. 07/748,146. The metal-coated particles can also be blended with other materials by state-of-the-art techniques. Other metal particles (such as particles of copper, silver, nickel, manganese, zinc, or silver-coated copper in combination with metal-coated ferrites and magnetites) dispersed within the polymer matrix may also be part of the blend formulation. A reinforcing, mesh shield layer is disposed over the filtering layer. The mesh shield layer comprises a braided, woven or served wire mesh of metal or metal-alloy or a lightweight metal-coated fiber; this shield layer covers only approximately 15–50% of the filtering layer.

Figure 1:
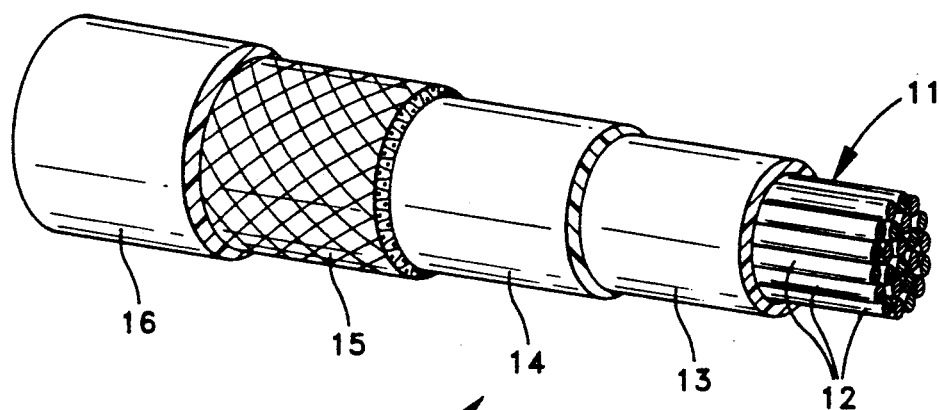
FIG. 1 illustrates a partially cut-away, perspective view of a typical, shielded "filter line" cable article, fabricated in accordance with the filtering and shield layer materials of the present invention.

Now referring to FIG. 1, a cable 10 of this invention is shown in partial cut-away perspective view. The cable 10 comprises a conductive core member 11, which contains one or more electrically conductive wires 12 of approximately 24 mils in diameter. The wires 12 can be straight-bundled or twisted together. The conductive wires 12 in a preferred embodiment are stranded wires of AWG 24 silver-plated copper alloy. The wires 12 are covered by a layer of primary insulation 13 comprising polyvinylidenefluoride (Kynar) or some other fluorinated polymer or polymers of approximately 2 mils thickness.

A filter layer 14 of approximately 3 to 5 mils, and preferably 4 mils thickness, is disposed over the primary insulation layer 13. The filter layer comprises silver-coated "spherical" ferromagnetic particles dispersed within and throughout a fluorinated rubberized elastomer (Viton), manufactured by E. I. Du Pont de Nemours, Inc.

The "spherical" ferromagnetic particles can be either ferrites, magnetites or a blend thereof. The filter layer 14 provides "filter line" function in an extended range. The matrix comprises approximately 10 to 90% by weight of the blend of materials. The metal coating on the particles can range from approximately 5% to 95% of the entire particle weight.

Disposed over the filter layer 14 is a reinforcing shield layer 15, approximately 4 mils thick and comprised of light-weight wire that is either braided or served into a mesh. The preferred composition of this wire comprises tin-copper alloy, AWG 38, which provides approximately a 25% coverage of the filter layer 14. The layer 15 provides physical reinforcement and strengthening for the ultra-thin layers of the cable 10. The reinforcing shield layer 15 also provides grounding and some shielding against EMI.

Over the reinforcing layer 15 is disposed a jacket layer 16, ranging from 1.5 to approximately 5 mils in thickness. The jacket layer 16 can comprise fluorinated polyethylenes, carbon-filled polyethelenes, etc.

Figure 2:
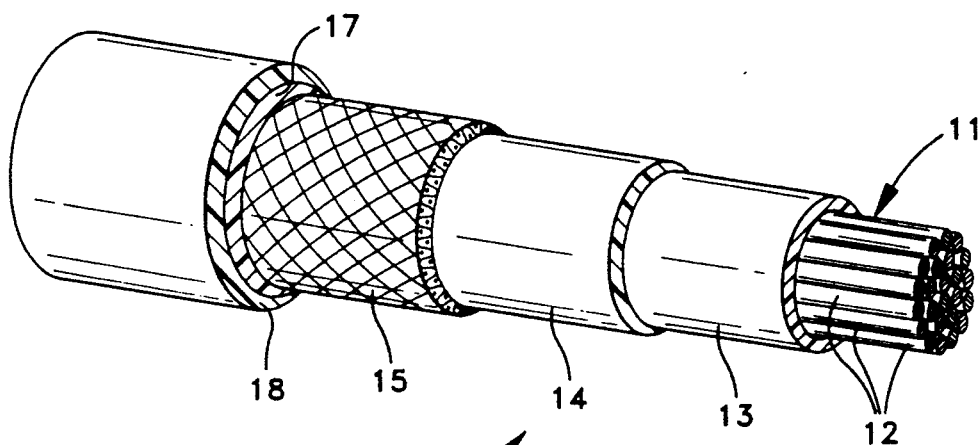
FIG. 2 depicts a first alternate embodiment of the "filter line" cable shown in FIG. 1, wherein the outermost jacket layer comprises a two-layer composite.

Now referring to FIG. 2, a first alternate embodiment of the cable 10 of FIG. 1 is illustrated. The jacket layer 16 comprising a fluorinated polyethylene is replaced by a composite of two fused layers, 17 and 18, of polytetrafluoroethylene (Teflon) and polyimide (Kapton); this composite is wrapped over the shield layer 15.

Figure 3:
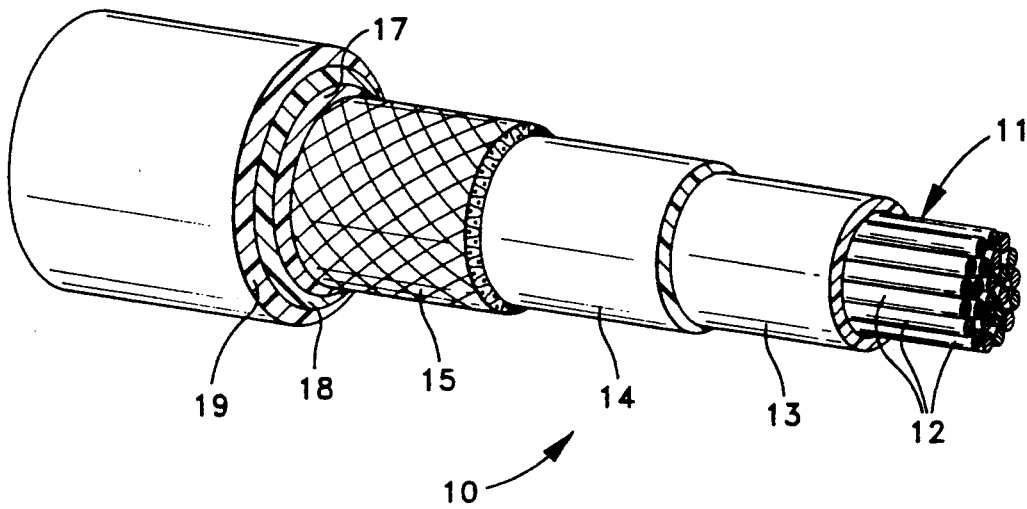
FIG. 3 shows a second alternate embodiment of the "filter line" cable shown in FIG. 1, wherein the outermost jacket layer comprises a three-layer composite.

Now referring to FIG. 3, a second alternate embodiment of the cable 10 of FIG. 1 is illustrated. The jacket layer 16 comprising a fluorinated polyethylene is replaced by a composite of three fused layers 17, 18 and 19 comprising Teflon, Kapton and Teflon; the composite is wrapped over the shield layer 15.

Figure 4:
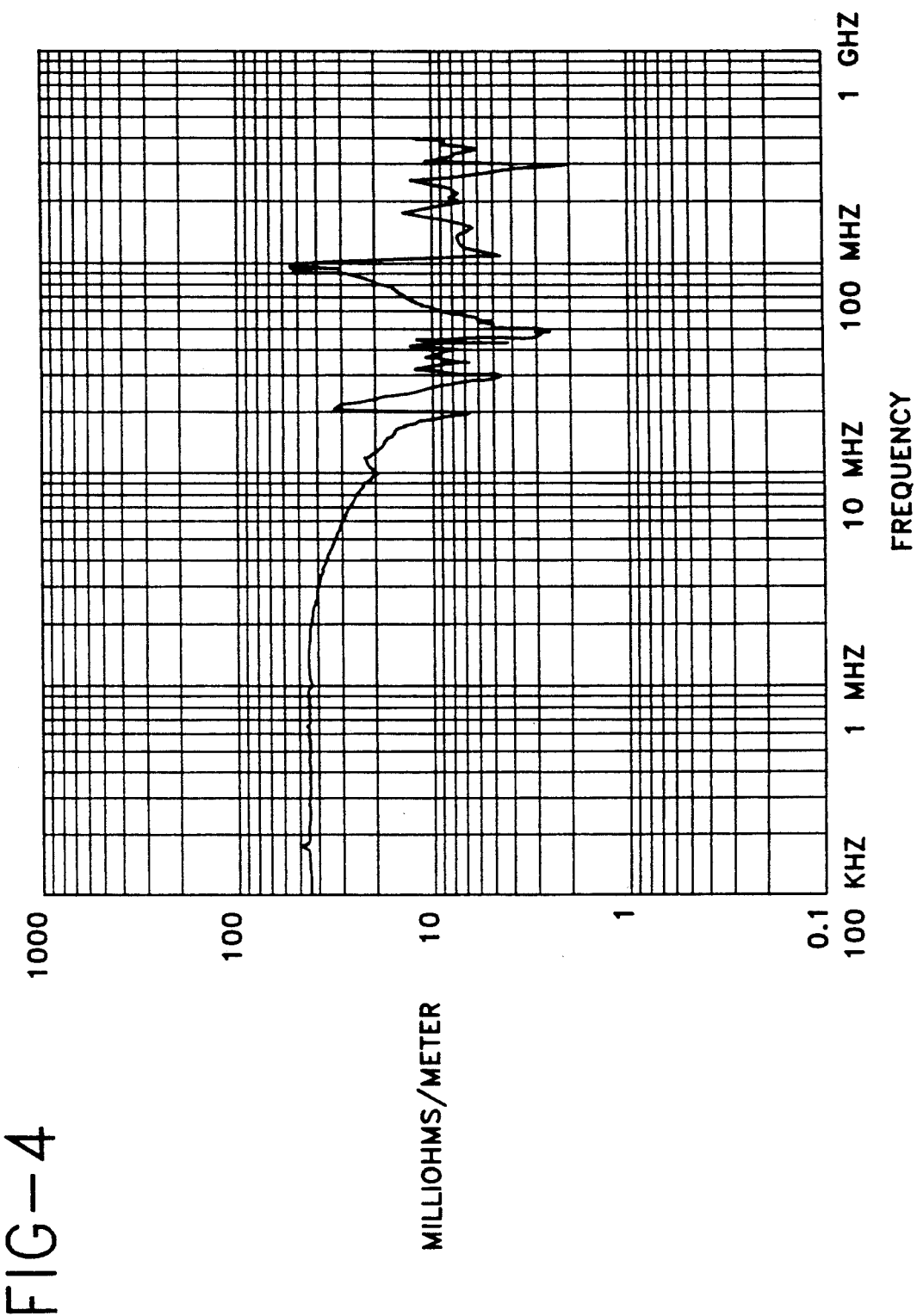
FIG. 4 depicts a graph illustrating the surface transfer impedance of the cable, as constructed in accordance with the cable of this invention as shown in FIG. 1.

Referring to FIG. 4, a graph of the surface transfer impedance developed over an operative frequency range of 100 KHz to 1 GHz is illustrated for the cable constructed, in accordance with cable 10 of FIG. 1.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described this invention, what is desired to be protected by LETTERS PATENT is presented by the subsequently appended claims.

What is claimed is:

1. An ultra-thin filter line cable having a reinforcing mesh and grounding layer disposed over a filter layer, comprising:
   a conductive core;
   a primary insulation layer disposed over said conductive core;
   a filter line layer disposed over said primary insulation layer including metal-coated ferromagnetic particles disposed in a polymer matrix, said filter line layer having a thickness of approximately between 3 to 5 mils;
   a reinforcing and grounding layer disposed over said filter line layer, said reinforcing and grounding layer comprising a conductive mesh and providing approximately between 15–50% coverage of said filter line layer, said reinforcing and grounding layer enhancing cable shielding, providing physical strengthening of the ultra-thin cable, and providing grounding; and
   a jacket of at least one layer disposed over said reinforcing layer.

2. The ultra-thin filter line cable of claim 1, wherein said metal-coated ferromagnetic particles further comprise particles selected from a group of materials consisting of metal-coated ferrite, metal-coated magnetite and combinations thereof.

3. The ultra-thin filter line cable of claim 1, wherein said metal-coated ferromagnetic particles are coated with a metal selected from a group consisting of silver, nickel, copper, zinc and manganese.

4. The ultra-thin filter line cable of claim 2, wherein said metal-coated ferromagnetic particles are comprised of "spherical" particles.

5. The ultra-thin filter line cable of claim 1, wherein said jacket comprises at least one layer of material selected from a group of materials consisting of fluorinated polyethylene, carbon-filled fluorinated polyethylene, polytetrafluoroethylene polytetrafluoroethylene fused with polyimide.

6. The ultra-thin filter line cable of claim 5, wherein said jacket comprises two fused layers comprising polytetrafluoroethylene and polyimide.

7. The ultra-thin filter line cable of claim 1, wherein said jacket comprises three fused layers comprising polytetrafluoroethylene, polyimide and polytetrafluoroethylene.

8. The ultra-thin filter line cable of claim 1, wherein the wire of said mesh of said reinforcing and grounding layer comprises metal or metal-alloy.

9. The ultra-thin filter line cable of claim 8 wherein said metal or metal-alloy comprises silver, coated on said wire of said mesh.

10. The ultra-thin filter line cable of claim 1 wherein said conductive mesh comprises metal-coated fiber strands.

11. An ultra-thin filter line cable having a reinforcing and grounding layer disposed over a filter line layer, comprising:
    a conductive core;
    a primary insulation layer disposed over said conductive core;
    a filter line layer disposed over said primary insulation layer including spherical, silver-coated ferromagnetic particles disposed in an elastomeric polymer matrix, said filter layer having a thickness of approximately between 3 and 5 mils;
    a reinforcing and grounding layer disposed over said filter line layer, said reinforcing and grounding layer comprising a mesh of conductive wire or fiber strands, and providing approximately between 15–50% coverage of said filter line layer, said reinforcing and grounding layer enhancing shielding and providing physical strengthening and grounding of the ultra-thin filter line cable; and
    a jacket of at least one layer disposed over said shield layer.

12. The ultra-thin filter line cable of claim 11, wherein said silver-coated ferromagnetic particles further comprise particles selected from a group of materials consisting of metal-coated ferrite, metal-coated magnetite and combinations thereof.

13. The filter line cable of claim 12, wherein said metal-coated ferromagnetic particles are blended with metal particles.

14. The filter line cable of claim 11, wherein said elastomeric polymer matrix comprises a fluorinated elastomer.

15. The filter line cable of claim 11, wherein said jacket comprises at least one layer of material selected from a group of materials consisting of fluorinated polyethylene, carbon-filled fluorinated polyethylene, polytetrafluoroethylene and polytetrafluoroethylene fused with polyimide.

16. The ultra-thin filter line cable of claim 11, wherein said metal-coated ferromagnetic particles are comprised of "spherical" particles.

17. The filter line cable of claim 15, wherein said jacket comprises two fused layers comprising polytetrafluoroethylene and polyimide.

18. The filter line cable of claim 15, wherein said jacket comprises three fused layers comprising polytetrafluoroethylene, polyimide and polytetrafluoroethylene.

* * * * *